US 8,810,876 B2

(12) United States Patent
Koehl et al.

(10) Patent No.: US 8,810,876 B2
(45) Date of Patent: Aug. 19, 2014

(54) DYNAMIC IMAGE GAMUT COMPRESSION BY PERFORMING CHROMA COMPRESSION WHILE KEEPING LIGHTNESS AND HUE ANGLE CONSTANT

(75) Inventors: Philippe Koehl, Kingersheim (FR); Holger Schuppan, Bottrop (DE)

(73) Assignee: Electronics for Imaging, Inc., Foster City, CA (US)

( * ) Notice: Subject to any disclaimer, the term of this patent is extended or adjusted under 35 U.S.C. 154(b) by 112 days.

(21) Appl. No.: 13/286,022

(22) Filed: Oct. 31, 2011

(65) Prior Publication Data

US 2013/0107292 A1    May 2, 2013

(51) Int. Cl.
*G03F 3/08* (2006.01)
*G06F 15/00* (2006.01)
*G06K 9/00* (2006.01)

(52) U.S. Cl.
USPC ............. 358/520; 358/1.9; 358/518; 382/167

(58) Field of Classification Search
USPC ............................. 358/1.9, 518, 520; 382/167
See application file for complete search history.

(56) References Cited

U.S. PATENT DOCUMENTS

| | | | | |
|---|---|---|---|---|
| 5,319,473 A * | 6/1994 | Harrington | .................... | 358/501 |
| 5,323,249 A * | 6/1994 | Liang | ............................ | 358/518 |
| 5,363,218 A * | 11/1994 | Hoshino | ........................ | 358/518 |
| 5,539,540 A * | 7/1996 | Spaulding et al. | ............ | 358/518 |
| 5,704,026 A * | 12/1997 | Wan | ............................... | 345/590 |
| 5,724,442 A * | 3/1998 | Ogatsu et al. | ................ | 382/167 |
| 5,809,164 A | 9/1998 | Hultgren, III | | |
| 5,915,077 A * | 6/1999 | Kulkarni et al. | ............... | 358/1.9 |
| 6,151,136 A * | 11/2000 | Takemoto | ...................... | 358/1.9 |
| 6,204,939 B1 * | 3/2001 | Lin et al. | ....................... | 358/518 |
| 6,373,595 B1 * | 4/2002 | Semba et al. | ................... | 358/1.9 |
| 6,719,392 B2 * | 4/2004 | Qiao | ............................... | 347/15 |
| 7,190,828 B2 * | 3/2007 | Jacob | ........................... | 382/162 |
| 7,265,819 B2 | 9/2007 | Raney | | |
| 7,403,304 B2 * | 7/2008 | Andreas et al. | ................ | 358/1.9 |
| 7,528,981 B2 | 5/2009 | Johnson et al. | | |
| 7,538,917 B2 * | 5/2009 | Rich et al. | ..................... | 358/518 |
| 2004/0169871 A1 * | 9/2004 | Uroz et al. | ..................... | 358/1.9 |
| 2006/0244982 A1 | 11/2006 | Zeng | | |
| 2007/0177173 A1 * | 8/2007 | Nishikawa | ..................... | 358/1.9 |
| 2009/0161953 A1 | 6/2009 | Ciurea et al. | | |

* cited by examiner

*Primary Examiner* — Houshang Safaipour
*Assistant Examiner* — Walter Yehl
(74) *Attorney, Agent, or Firm* — Michael A. Glenn; Perkins Coie LLP (57) ABSTRACT

A method and apparatus are provided by which optimum usage of available color space of an output device, e.g. an inkjet printer or laser printer, is achieved. Gamut compression is dynamically computed by being dependent on contents of a print job, as opposed to only using pre-calculated or static tables or ICC rendering intents.

12 Claims, 6 Drawing Sheets

DYNAMIC IMAGE GAMUT COMPRESSION BY PERFORMING CHROMA COMPRESSION WHILE KEEPING LIGHTNESS AND HUE ANGLE CONSTANT

BACKGROUND OF THE INVENTION

1. Technical Field

This invention relates generally to the field of printing devices. More specifically, this invention relates to printing colored images using International Color Consortium (ICC) color management.

2. Description of the Related Art

Presently, for printing colored images using International Color Consortium (ICC) color management, there are three methods of color rendering or rendering intents available in the art. Such three methods are referred to by one skilled in the art as perceptual rendering intent (Perceptual RI), colorimetric rendering intent (Colorimetric RI), and saturation rendering intent (Saturation RI.) Each such rendering intent uses pre-calculated color lookup tables (CLUT), e.g. A2B and B2A tables, which are embedded in the ICC color profile describing the particular output device. CLUT may be stored as an n-dimensional array, where each dimension has a number of entries in accordance with the number of grid points (see Specification ICC.1:2004-10.) Examples of output devices discussed herein may include, but are not limited to, inkjet printers, laser printers, photographic imaging devices, and printing presses.

For purposes of discussion herein, applying Perceptual RI or Saturation RI may be viewed by one skilled in the art as squeezing or compressing an entire color space or gamut from the device of the source image, such as a scanning device or camera, into the available gamut of the output device, such as a digital printer. Such action has the effect of changing or altering all the colors that are to be rendered, i.e. inside and outside of the gamut of the output device.

For purposes of discussion herein, applying Colorimetric RI may be viewed as keeping colors that are inside the gamut of the printing device as they are while clipping out-of-gamut colors to the nearest available color.

SUMMARY OF THE INVENTION

A method and apparatus are provided by which optimum usage of available color space of an output device, e.g. an inkjet printer or laser printer, is achieved. Gamut compression is dynamically computed by being based on contents of a print job, as opposed to using only pre-calculated or static tables or ICC rendering intents.

DETAILED DESCRIPTION OF THE INVENTION

It should be appreciated that in accordance with an embodiment, dynamic rendering intent is based on the gamut of the print job, as opposed to the gamut of the source profile as in the prior art. In an embodiment, optimum usage of the available color space of an output device, e.g. an inkjet printer or laser printer, is achieved by dynamically computing gamut compression based on the contents of the print job, as opposed to using only pre-calculated or static tables or ICC rendering intents. Particular embodiments, but not limited to such embodiments, for dynamically computing gamut compression are described in detail hereinbelow.

It should be appreciated that current techniques in the art do not take image content into consideration when rendering the image on an output device. It should be appreciated that the gamut information of the output device may be described in an ICC profile or any other multidimensional color lookup table format that translates a set of input colors to the set of the output device colors. Typically, the decision whether to perform clipping or compression is made based on the knowledge of the source and target devices, e.g. a camera and a printer, respectively, and not on the print job. Thus, such techniques cannot and do not make maximum use of the available gamut of the output device with respect to each individual print job.

For example, with Perceptual or Saturation RI all colors of the print job are compressed. Put another way, all colors of the print job are compressed into the gamut of the output device, regardless of whether the particular color was inside the gamut of the output device already. Thus, there may be colors in an image which are unnecessarily compressed and lose chroma, even when the printing device may be able to print such colors correctly, i.e. without compressing such colors in the image. Compression is performed proportionately. That is, the outermost colors are compressed until such colors are in the gamut of the output device. However, it should be appreciated that all of the other colors of the print job are compressed for the purpose of making room for such outer colors.

In this way, the full gamut of the output device may not be employed. While with the above-described technique there are no losses of details, there may be losses of accuracy. For example, there may be loss of saturation in high-chroma areas. The compression that is done by the perceptual intent technique is computed based on the gamut of the source- and output-profiles.

It should be appreciated that with perceptual intent, even if the job itself uses only a small portion of the color space that is described by the source profile and even if the job is completely inside the gamut of the output profile, the job may be compressed.

With Colorimetric RI, some colors may be clipped. For example, every color which is outside the gamut of the output device is assigned a corresponding color at the edge of the gamut of the output device. It should be appreciated that several different colors in the print job may end up being assigned to a same corresponding color. Thus, such different colors in the print job may be printed with the same output color of the device. Thus, details may be lost at the clipped areas. Subsequently, after the printing process clips such colors, some of the resulting output colors may appear flat and with no differentiation.

In addition, an end-user may have to decide in a manual fashion between the two rendering intents described hereinabove. For example, the end-user may base his or her decision on the following:

If the print job fits the gamut of the output device, relative colorimetric is the better choice.

Otherwise, perceptual should be used.

However, two open questions remain, as follows:

How can the end-user know whether the job fits?

What can the end-user do, e.g. how are either of the above-two methods selected, in automated environments, such as when using a large printer, for example?

Dynamic Compression Algorithm

A dynamic compression algorithm in accordance with an embodiment is provided as follows. The print job is analyzed on the fly, i.e. dynamically, before being printed. The print job is analyzed by, but not limited to, (a) collecting the color information of each pixel of the print job, (b) determining, for each pixel, a location of such pixel in the 3-dimensional color space, e.g. by finding the L*a*b* or XYZ coordinates of the pixel, and (3) determining the gamut of the print job by using, but not limited to, the outermost color coordinates of the pixels in the print job.

Based on such analysis, the dynamic algorithm determines, whether the print job or parts thereof are within the gamut of the output device. For example, the gamut or parts thereof of the print job can be compared with the gamut or parts thereof of the output device. When the print job or parts thereof are within the gamut of the output device, no compression or clipping is performed. When it is determined that some colors of the print job may not be in the gamut of the output device, compression processing is performed.

In accordance with an embodiment, a rendering intent algorithm is provided, as follows:

Use relative colorimetric intent, when the print job fits completely into the gamut of the printer;

Use perceptual intent, when the gamut is mainly larger than the printer gamut and where how much larger may be, but is not limited to, a predetermined amount, for example, based on business rules; and Perform a dynamic gamut compression when only some parts of the job are out of the printer gamut.

Figure 1:
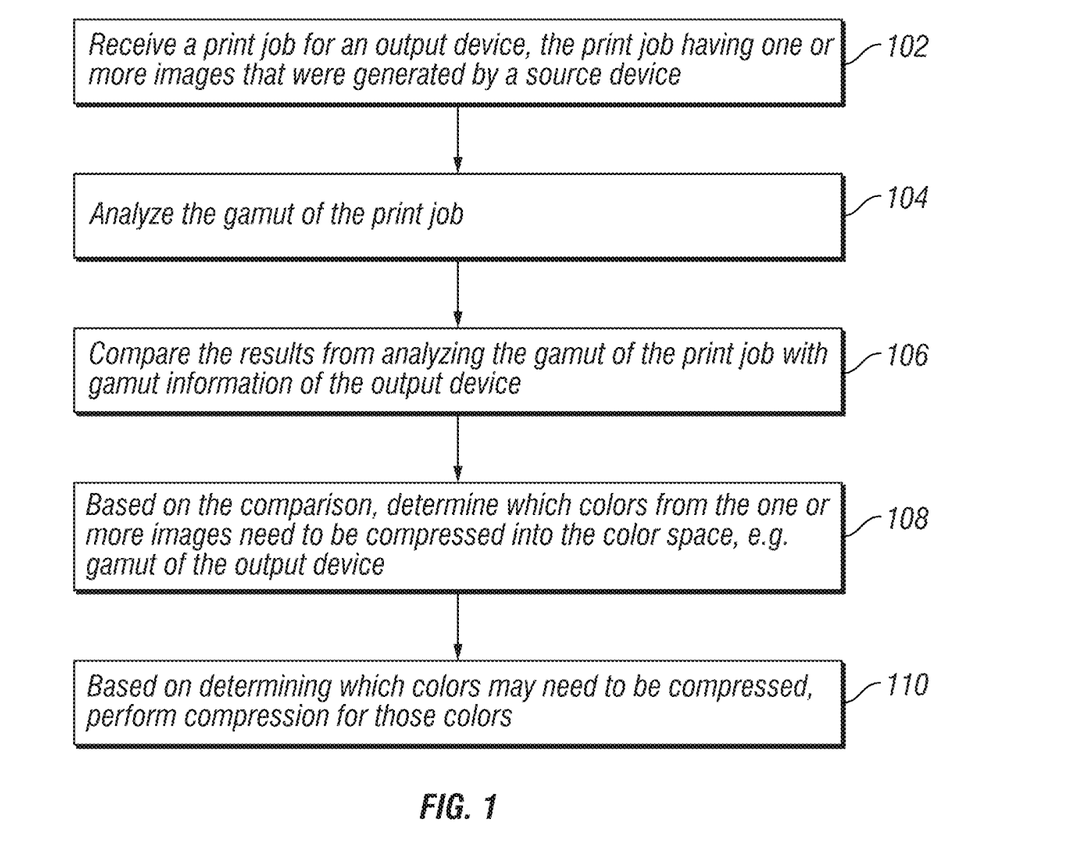
FIG. 1 is a flow diagram for a compression algorithm according to an embodiment.

An exemplary dynamic compression algorithm in accordance with an embodiment can be understood by reference to FIG. 1. FIG. 1 is a flow diagram for a compression algorithm according to an embodiment.

A print job having at least one image that is associated with a source device, such as a scanning device or camera, is received by a processor (102). The processor is configured to analyze the gamut of the print job (104), e.g. in accordance with, but not limited to, the details about analyzing the gamut of the print job as described above. The results from analyzing the gamut of the print job are compared with the gamut information of the output device (106). Based on the results of the comparison, those colors from the image which may need to be compressed into the output color space of the output device (108) are determined. Based on determining which colors may need to be compressed, compression is performed on only those determined colors and no others (110). It should be appreciated that by such algorithm, compression is performed to the necessary amount and not more or beyond. For example, performing compression to the necessary amount and not more or beyond may mean, but is not limited to meaning, that compression is performed only from the gamut edge of the job to the gamut edge of the output device but not beyond, such as for example, to the inside of the output device's gamut.

Comparing Gamuts

In an embodiment, comparing the gamut of the print job or of the image in the print job to the gamut of the output device may be performed, but is not limited to, as follows. A processor may divide an image into layers of different brightness's, e.g. into L-values, and each layer into discrete hue angles, e.g. h-values. Subsequently, the maximum chroma of the image colors at those particular L-h combinations is compared to the maximum chroma of the output device at the same L-h combinations. Thus, such embodiment described above may ensure that print jobs are printed using the maximum available gamut of the output device without colors being clipped or unnecessarily compressed.

Figure 2:
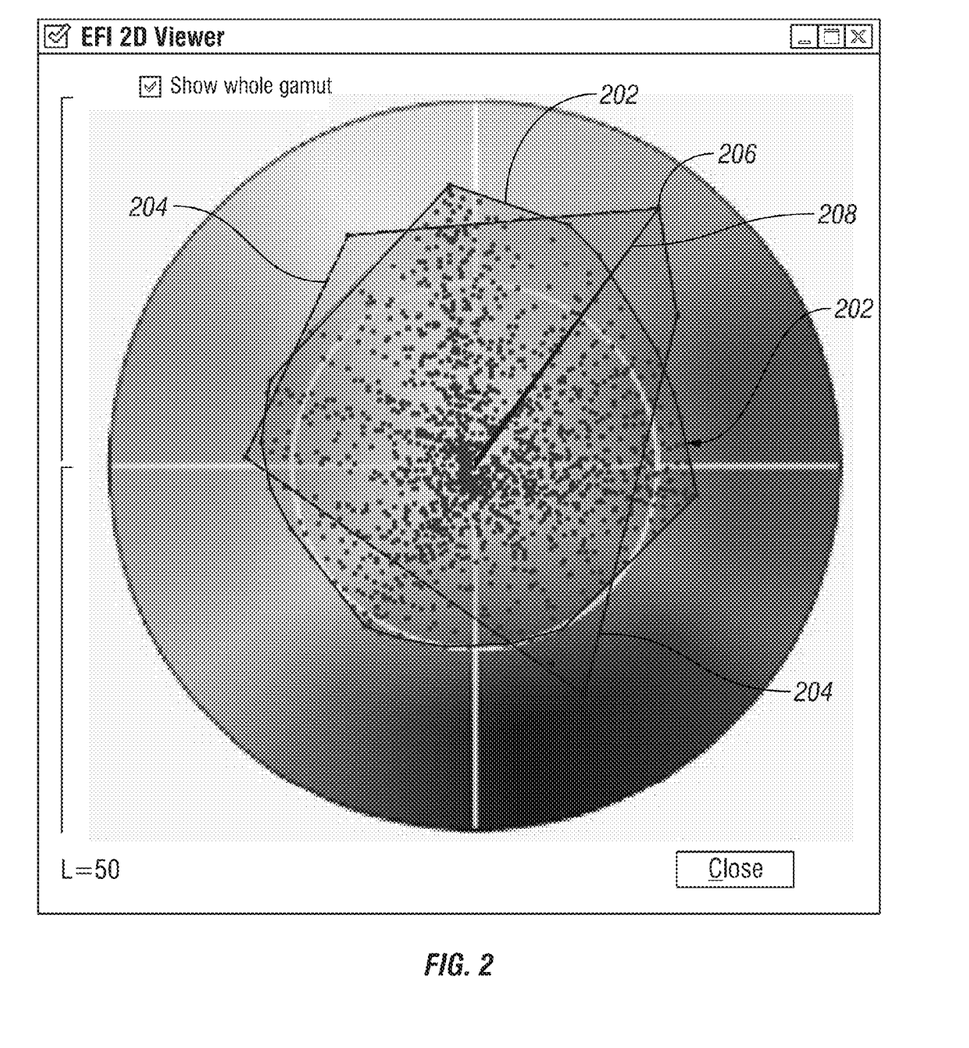
FIG. 2 is a schematic diagram showing the gamut of a typical inkjet printer and the gamut of a print job, each as a polygonal region defined by the outermost colors in the gamut, according to an embodiment.

An embodiment can be understood with reference to FIG. 2. The particular details are by way of example and are not meant to be limiting. FIG. 2 is a schematic diagram showing the gamut of a typical inkjet printer as a first polygonal region defined by the outermost colors in the gamut 202. As well, FIG. 2 shows a second polygonal region defined by the outermost colors of a sample print job 204. Further, such illustrated gamut 202 and gamut 204 are at a particular brightness, as shown in the figure at the bottom left-hand corner as at brightness L=50. For the purposes of discussion herein, it should be appreciated that the boundary of the first region, gamut 202, is demarked as a solid line, while the boundary of the second region, gamut 204, is demarked as a hashed line. In accordance with the current art, one has the choice either to squeeze colors that are printed in the second, hashed region into the first, solid region using Perceptual and Saturation RI. Such squeezing may result in unnecessarily de-saturated colors. Or, one may have the choice of leaving colors of the job which are inside the solid area alone and clip the colors which are outside the solid area, thus creating a flat appearance and no differentiation.

In sharp contrast, approaches in accordance with embodiments herein compute an individual gamut compression factor for each combination of brightness (L) and hue angle. Then, based in part on the computed individual compression factor, compress only when and where it is needed. In one embodiment, a compression factor is, but is not limited to, a floating point number that is multiplied by the chroma value of the print job gamut at the above mentioned L and h coordinates to compress the chroma value in such a way that the chroma value fits into the gamut of the output device. For example, if the chroma value of the job for a certain L-h combination is equal to 125 and the chroma of the output device at the same L-h combination is equal to 100, then the compression factor is equal to 0.8, because 125×0.8=100. In the embodiment, those colors which fall outside the gamut of the printer, e.g. outside the first, solid line 202, are compressed. Put another way, the phrase, compressing those colors which fall outside the gamut, may refer to compressing those colors at a certain hue angle and brightness that are outside printer gamut 202, as well as those colors which fall inside printer gamut 202 for the purposes of making room for those outside printer gamut 202.

In an embodiment, for a particular point that is outside the gamut of the output device, the points that are consequently compressed, in addition to the particular point, are those points at the same hue-angle and brightness value. An example may be understood with reference to FIG. 2. In the example, a point 206 is shown to be inside print job gamut 204 and is determined by the embodiment to be outside of printer gamut 202. As well, point 206 is shown to be at about 55 degrees from the horizontal line in the illustrated coordinate system. Thus, in accordance with the embodiment, because point 206 is determined to be outside print gamut 202, the points lying on a line 208 from the origin of the graph to point 206 are compressed. It has been found that when the points lying on line 208 are not compressed, then compressing point 206 results in overriding one or more values with compressed values, which is not desirable.

The process of comparing the results 106 can be further described in accordance with an embodiment as follows. Levels of brightness are determined. For example, such levels of brightness are determined from L=0 to L=100. Then, at each determined level of brightness, hue angles are traversed and studied. For example and referring to FIG. 2, at L=50, the system traverses the hue space by one degree hue-angles at a time. Thus, for each hue-angle, the system determines whether any points are outside the gamut of the output device. When no points are out of gamut of the output device, then no compression is performed on the corresponding points. If there is more than one point outside such gamut, the system determines which point is outside the gamut by the greatest amount. Then, the system compresses all such points at such hue-angle by the factor determined by the chroma value of the point outside the gamut by the greatest amount. It should be appreciated that for optimum results, a neighborhood of points at such hue-angle is compressed to avoid disruptions and to ensure smooth transitions in images and gradation elements. For purposes of discussion herein, a neighborhood of points may be determined by one or more grid points about the particular point. Grid points refer to the points, sometimes also called "nodes", in the respective B2A table of the ICC profile describing the printing device color space.

In an embodiment, analyzing or determining the color gamut of print job (104) is performed at a low resolution, so as not to consume more time or resources as is necessary. As an example, while the print resolution may be 300 dpi and higher, it may be sufficient to perform the analysis at a resolution of 72 dpi.

It should be appreciated that embodiments described herein may be used in color printing applications, such as for example, EFI™ Fiery® XF, EFI™ VUTEk®, and EFI™ Jetrion®. It should further be appreciated that embodiments described herein may result in higher print quality and more colorful images. For each print job, the maximum available gamut for that job may be printed while guaranteeing that no color clipping occurs.

Another Embodiment

Using Expansion

Figure 3:
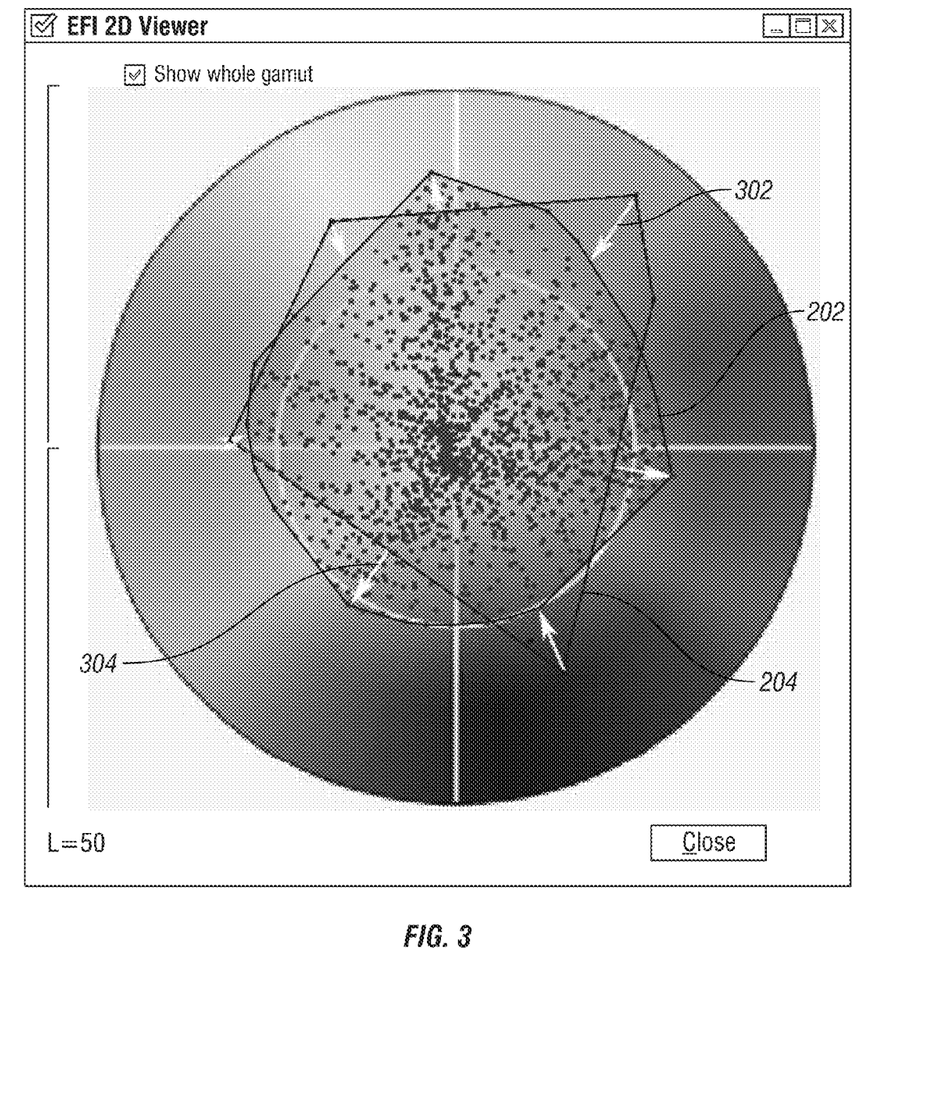
FIG. 3 is a schematic diagram showing the printer gamut region and the region of the print job as in FIG. 2, and further showing arrows representing where to compress the color values and where to expand the color values, according to an embodiment.

An embodiment is provided which is configured to perform expansion on particular color values in addition to being configured to perform compression on particular color values. One embodiment can be understood with reference to FIG. 3. FIG. 3 is a schematic diagram showing printer gamut region 202 and region of the print job 204 as in FIG. 2. Further, FIG. 3 shows arrows pointing inwards 302 to represent compressing color values to be within printer gamut region 202. Further, FIG. 3 shows arrows pointing outwards 304 to represent expanding color values from within printer gamut region 202 to the outer boundaries of printer gamut region 202. Thus, techniques are provided herein that apply dynamic rendering intent, by which color values are squeezed only as much as needed and expanded if possible.

In an embodiment, expanding color values from within printer gamut region to the outer boundaries of printer gamut region 202 is analogous, yet somewhat opposite, to the embodiments for compression, as described hereinabove. That is, one skilled in the art can readily modify embodiments hereinabove for compression to be configured for performing expansion on colors, as well.

By way of example, and not meant to be limiting, in one embodiment, a processor may divide an image into layers of different brightness's, e.g. into L-values, and each layer into discrete hue angles, e.g. h-values. Subsequently, when it is determined that no chroma of the print job is outside the gamut of the output device (as described hereinabove,) the minimum chroma of the image colors at those particular L-h combinations is compared to the minimum chroma of the output device at the same L-h combinations. When it is determined that the minimum chroma of the image is less than the minimum chroma of the output device, an expansion factor can be computed. When the expansion factor is computed, the chroma of the print job at the same brightness and hue angle combination are multiplied by the expansion factor. Thus, such embodiment described may ensure that print jobs are printed using the maximum available gamut of the output device without colors being clipped or unnecessarily compressed.

Figure 4:
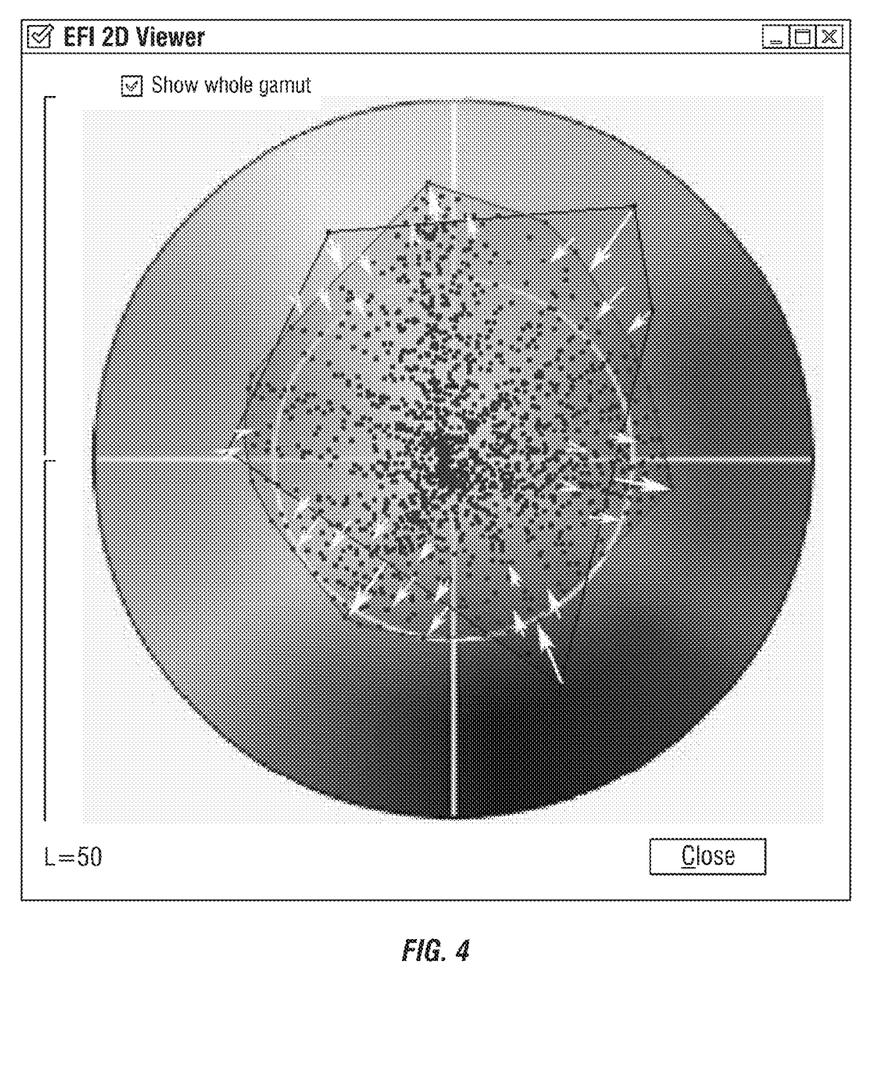
FIG. 4 is a schematic diagram showing the printer gamut region and the region of the print job as in FIG. 2 or FIG. 3, and further showing arrows representing in a proportional fashion, based on their size, how much to compress the color values and how much to expand the color values, according to an embodiment.

Another embodiment can be understood with reference to FIG. 4. FIG. 4 is a schematic diagram showing the printer gamut region and the region of the print job as in FIG. 2 or FIG. 3. Further, FIG. 4 shows arrows representing, in a proportional fashion and based on their respective magnitudes, how much to compress the color values and how much to expand the color values in accordance with the embodiment.

Following is a process for dynamic rendering intent, also referred to, but not limited to, dynamic gamut compression, in accordance with an embodiment:

The location of a print job in an independent color space is compared with the location of the print job in the color space of the device, e.g. printer;

When it is determined that particular hue angles of the print job in the independent color space are out of gamut of the color space of the device, then the embodiment compresses the color space of the print job only at those hue angles which were determined to be out of gamut;

It is determined whether the color space of the print job can be expanded, e.g. it is determined whether the color space of the print job still has "room" at particular places with the color space of the print job; and The embodiment does not touch or act on critical colors, e.g. gray and the like.

Thus, it should be appreciated that embodiments do not perform any unnecessary compressions. Further, embodiments herein print each print job using the maximum available gamut of the printer without clipping any color. Further, embodiments herein do not require any user to decide upon which rendering intent to use, as the decisions are made automatically.

Figure 5:
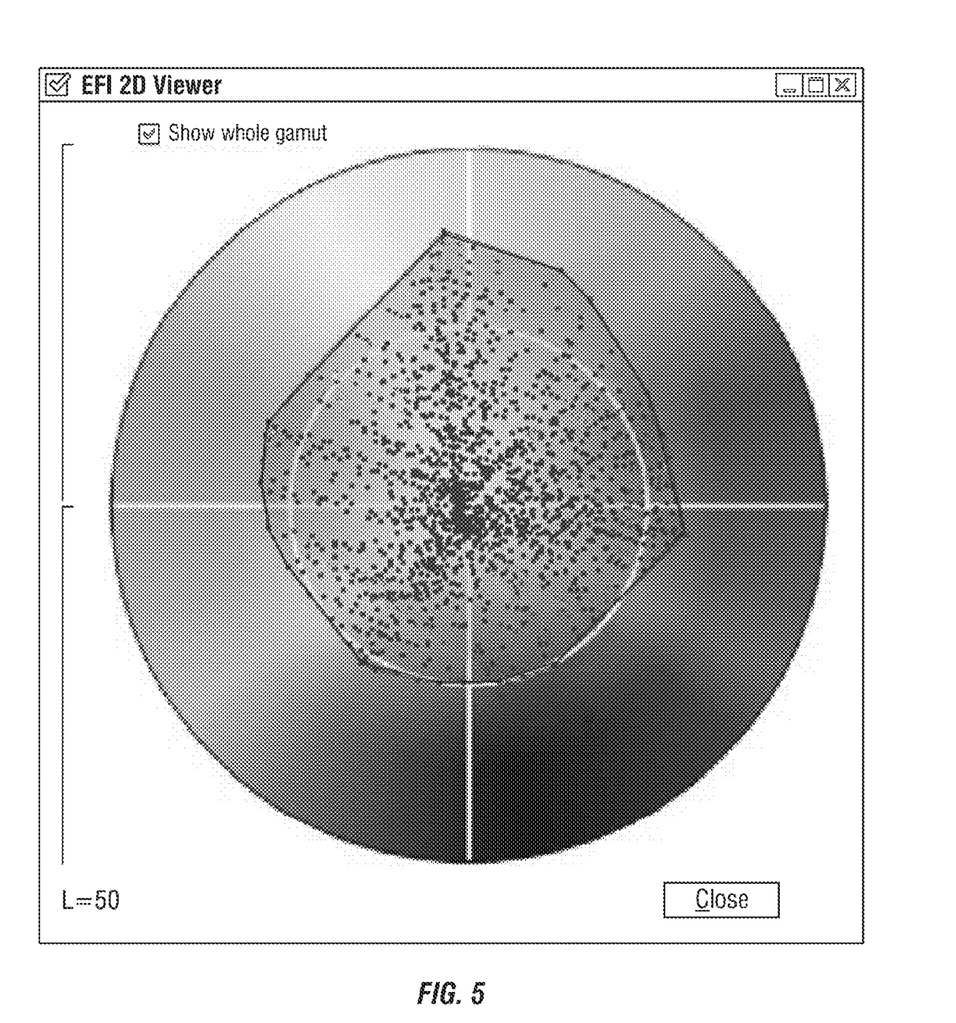
FIG. 5 is a schematic diagram showing the result of applying compression and expansion techniques to any of FIGS. 2-4, according to an embodiment.

Results achieved by way of embodiments herein can be understood with reference to FIG. 5. FIG. 5 is a schematic diagram showing the result of applying compression and expansion techniques to any of FIGS. 2-4, according to an embodiment. Notably, the result as shown in FIG. 5 uses, in a proportional fashion, the maximum available gamut of the printer without clipping any color.

Thus, by way of embodiments, the following, but not limited to the following, are true. An end-user may get the maximum performance from the printer that is possible. The end-user may get the maximum performance from the printer in an automated fashion. The end-user may get the maximum perform from the printer on a per-job basis, as opposed to the process being based on the source profile, which is an inferior technique as colors may be clipped or unnecessarily compressed. The end-user no longer has to know or be familiar with the content of the particular print job. Gray colors stay untouched.

An Example Machine Overview

Figure 6:
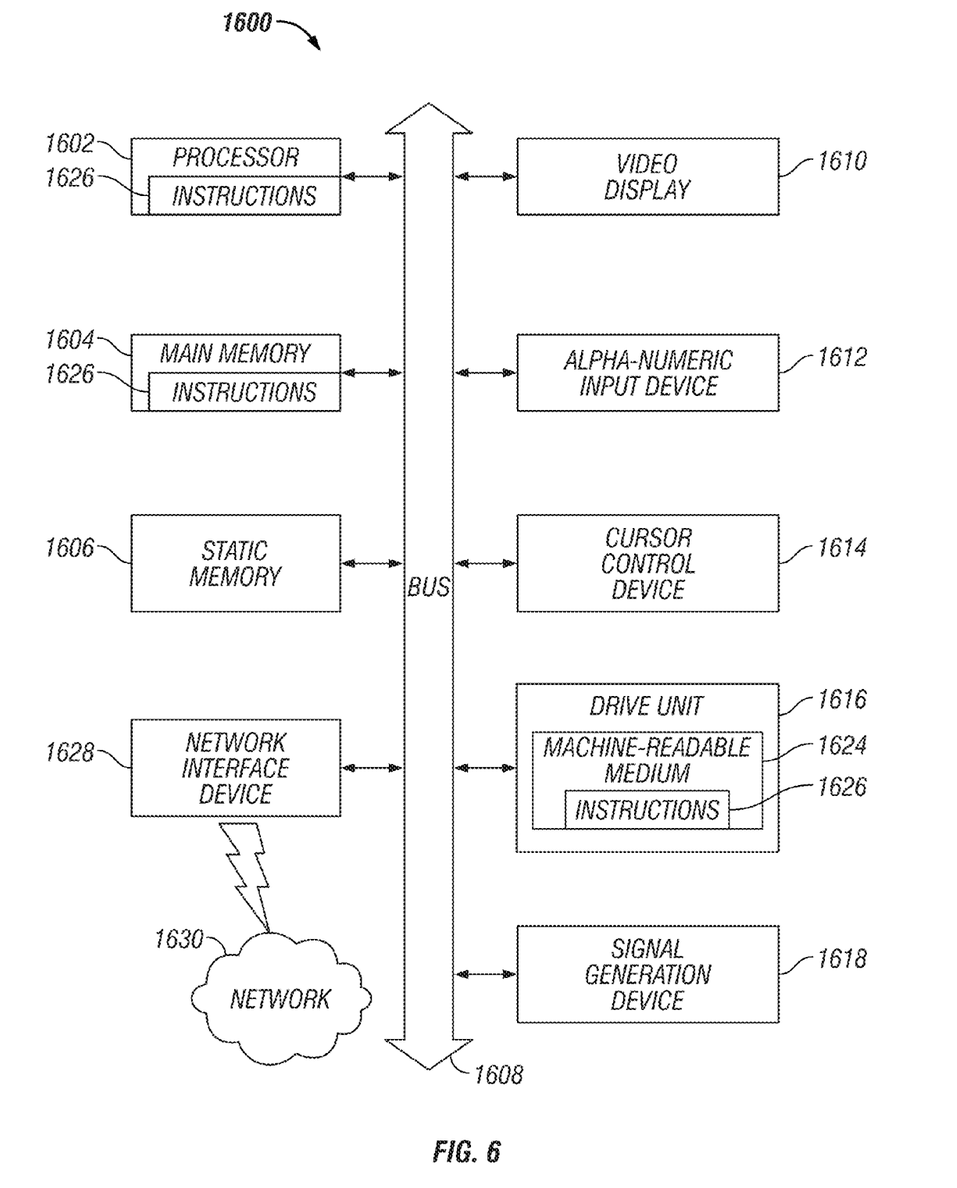
FIG. 6 is a block schematic diagram of a system in the exemplary form of a computer system according to an embodiment.

FIG. 6 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing computations with cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions that enable users, e.g. users on the go, to print using dynamic image gamut compression anywhere on such internet-enabled devices, servers, or clients. It further should be appreciated that one or more cloud computing embodiments include printing with dynamic image gamut compression using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for dynamic image gamut compression, comprising the steps of:
    receiving a print job for an output device, the print job having at least one image that was generated by a source device;
    responsive to receiving the print job, determining a gamut of the print job by dividing said at least one image into one or more layers of different brightness:
        for each layer of said one or more layers:
            dividing said layer into discrete hue angles;
                for each hue angle of said discrete hue angles:
                    determining a maximum chroma;
    for each determined maximum chroma, comparing the determined maximum chroma at the specific hue angle and at the specific brightness layer to a maximum chroma of said output device at the same specific brightness layer and at the same specific hue angle; and
    determining one or more colors from the print job is outside of the gamut of the output device when its maximum chroma is greater than said maximum chroma of said output device;
    performing compression on said colors by computing an individual gamut compression factor for each combination of specific brightnesses and specific hue angles and multiplying the computed individual gamut compression factor to the chroma value of the print job gamut at the specific brightness and specific hue angle corresponding to the color that is out of the gamut of the output device;
    wherein one or more steps are performed by one or more processors.

2. The computer-implemented method of claim 1, wherein determining the gamut of the print job further comprises the steps of:
    collecting color information of each pixel of the print job;
    based in part on the collected color information of each pixel, determining for each pixel the coordinates of the pixel in a color space;

based in part on determining the coordinates of each pixel in the color space, determining the gamut of the print job by determining and using outermost coordinates of the determined coordinates of the pixels in the print job.

3. The computer-implemented method of claim 1, wherein determining the gamut of the print job is performed at a lower resolution than a corresponding print resolution of said print job.

4. The computer-implemented method of claim 1, further comprising the steps of:
- based in part on the comparison, determining one or more colors from the print job that are inside of the gamut of the output device; and
- based on determining said one or more colors that are inside of the gamut of the output device, performing expansion on such colors to the outer boundaries of the gamut of the output device.

5. the computer-implemented method of claim 1, further comprising the steps of:
- when no maximum chroma of said at least one image is greater than said maximum chroma of said output device, determining whether a minimum chroma of said at least one image is less than a minimum chroma of said output device; and
- in response to determining a minimum chroma of said at least one image is less than a minimum chroma of said output device; performing expansion on pixels of said print job that are at said brightness and hue angle.

6. An apparatus for dynamic image gamut compression, comprising:
- a receiving processor for receiving a print job for an output device, the print job having at least one image that was generated by a source device;
- a determining processor for determining a gamut of the print job, responsive to receiving the print job, by dividing said at least one image into one or more layers of different brightness:
  - for each layer of said one or more layers:
    - dividing said layer into discrete hue angles;
      - for each hue angle of said discrete hue angles:
        - determining a maximum chroma;
- a comparison processor, for each determined maximum chroma, comparing the determined maximum chroma at the specific hue angle and at the specific brightness layer to a maximum chroma of said output device at the same specific brightness layer and at the same specific hue angle; and
- a determining processor for determining one or more colors from the print job is outside of the gamut of the output device when its maximum chroma is greater than said maximum chroma of said output device;
- a compression processor for performing compression on said colors by computing an individual gamut compression factor for each combination of specific brightnesses and hue angles and multiplying the computed individual gamut compression factor to the chroma value of the print job gamut at the specific brightness and specific hue angle corresponding to the color that is out of the gamut of the output device.

7. The apparatus of claim 6, further comprising for determining the gamut of the print job:
- a collecting processor for collecting color information of each pixel of the print job;
- a determining processor for determining for each pixel the coordinates of the pixel in a color space based in part on the collected color information of each pixel;
- a determining processor for determining the gamut of the print job by determining and using outermost coordinates of the determined coordinates of the pixels in the print job based in part on determining the coordinates of each pixel in the color space.

8. The apparatus of claim 6, wherein determining the gamut of the print job is performed at a lower resolution than a corresponding print resolution of said print job.

9. The apparatus of claim 6, further comprising:
- a determining processor for determining, based in part on the comparison, one or more colors from the print job that are inside of the gamut of the output device; and
- an expansion processor for performing expansion, based in part on determining said one or more colors that are inside of the gamut of the output device, on such colors to the outer boundaries of the gamut of the output device.

10. the apparatus of claim 6, further comprising:
- a determining processor for determining whether a minimum chroma of said at least one image is less than a minimum chroma of said output device, when no maximum chroma of said at least one image is greater than said maximum chroma of said output device;
- an expansion processor for performing expansion on pixels of said print job that are at said brightness and hue angle in response to determining a minimum chroma of said at least one image is less than a minimum chroma of said output device.

11. A non-transitory computer readable storage medium for dynamic image gamut compression having stored thereon a computer program comprising a program code which, when executed by a processor, performs the steps of:
- receiving a print job for an output device, the print job having at least one image that was generated by a source device;
- responsive to receiving the print job, determining a gamut of the print job by dividing said at least one image into one or more layers of different brightness:
  - for each layer of said one or more layers:
    - dividing said layer into discrete hue angles;
      - for each hue angle of said discrete hue angles:
        - determining a maximum chroma;
- for each determined maximum chroma, comparing the determined maximum chroma at the specific hue angle and at the specific brightness layer to a maximum chroma of said output device at the same specific brightness layer and at the same specific hue angle; and
- determining one or more colors from the print job is outside of the gamut of the output device when its maximum chroma is greater than said maximum chroma of said output device;
- performing compression on said colors by computing an individual gamut compression factor for each combination of specific brightnesses and specific hue angles and multiplying the computed individual gamut compression factor to the chroma value of the print job gamut at the specific brightness and specific hue angle corresponding to the color that is out of the gamut of the output device.

12. The non-transitory computer readable storage medium of claim 11, the program code further comprising the steps of:
- when no maximum chroma of said at least one image is greater than said maximum chroma of said output device, determining whether a minimum chroma of said at least one image is less than a minimum chroma of said output device; and
- in response to determining a minimum chroma of said at least one image is less than a minimum chroma of said output device; performing expansion on pixels of said print job that are at said brightness and hue angle.

* * * * *